(12) United States Patent
Saito et al.

(10) Patent No.: US 7,872,999 B2
(45) Date of Patent: Jan. 18, 2011

(54) METHOD AND RELAY STATION FOR AGGREGATING SERVICE CONNECTION IDENTIFIERS IN IEEE 802.16

(75) Inventors: Kenji Saito, Fujimino (JP); Shoji Kaneko, Fujimino (JP); Haruki Izumikawa, Fujimino (JP)

(73) Assignee: KDDI Corporation, Tokyo (JP)

( * ) Notice: Subject to any disclaimer, the term of this patent is extended or adjusted under 35 U.S.C. 154(b) by 473 days.

(21) Appl. No.: 11/652,484

(22) Filed: Jan. 12, 2007

(65) Prior Publication Data

US 2007/0178880 A1 Aug. 2, 2007

(30) Foreign Application Priority Data

Jan. 27, 2006 (JP) ............................. 2006-018432

(51) Int. Cl.
   - H04W 4/00 (2009.01)
   - H04W 40/00 (2009.01)
   - H04H 20/71 (2008.01)
   - H04J 3/24 (2006.01)
   - H04L 12/28 (2006.01)

(52) U.S. Cl. .................. 370/328; 370/349; 370/331; 370/400; 370/312; 455/428

(58) Field of Classification Search ................ 370/349, 370/331, 328, 312, 400, 469; 455/452.2, 455/428, 445, 454, 515, 517, 561
See application file for complete search history.

(56) References Cited

U.S. PATENT DOCUMENTS

| | | | |
|---|---|---|---|
| 7,466,985 B1 * | 12/2008 | Handforth et al. | 455/454 |
| 7,505,775 B2 * | 3/2009 | Ryu et al. | 455/458 |
| 7,526,292 B2 * | 4/2009 | Kim et al. | 455/450 |
| 2003/0210693 A1 * | 11/2003 | Grabner et al. | 370/392 |
| 2006/0002383 A1 * | 1/2006 | Jeong et al. | 370/360 |
| 2007/0072604 A1 * | 3/2007 | Wang | 455/428 |
| 2007/0097945 A1 * | 5/2007 | Wang et al. | 370/349 |

(Continued)

OTHER PUBLICATIONS

IEEE Std 802.16-2004, "IEEE Standard for Local and Metropolitan Area Networks, Part 16: Air Interface for Broadband Wireless Access Systems", Oct. 1, 2004, pp. 220-221.

(Continued)

*Primary Examiner*—Jean A Gelin
*Assistant Examiner*—Mong-Thuy Tran
(74) *Attorney, Agent, or Firm*—Westerman, Hattori Daniels & Adrian, LLP

(57) ABSTRACT

In a method and a RS (Relay Station) for aggregating service connection identifiers in IEEE 802.16, the RS receives a 1st QoS (Quality of Service) from a 1st MS (Mobile subscriber Station), and stores a 1st SFID/CID (Service Flow Identifier)/CID (Connection Identifier) between a BS (Base Station)-RS corresponding to a 2nd SFID/CID between the RS-MS in table information. The RS receives a DSA-REQ (Dynamic Service Addition Request) including a QoS same as the 1st QoS from a 2nd MS, and sends a DSC-REQ (Dynamic Service Change REQuest) to the BS. Then, the RS receives a DSC-RSP (Dynamic Service Change ReSPonse) from the BS, assigns a 3rd SFID/CID between the RS-MS, and stores a 3rd SFID/CID corresponding to the 1st SFID/CID in the table information. The RS sends a DSA-RSP (Dynamic Service Addition ReSPonse) including 3rd SFID/CID to 2nd MS.

10 Claims, 5 Drawing Sheets

U.S. PATENT DOCUMENTS

2007/0217364 A1* 9/2007 Kawakami .................. 370/331

OTHER PUBLICATIONS

IEEE Std 802.16e/D12, Draft IEEE Standard for Local and Metropolitan Area Networks, Part 16: Air Interface for and Mobile Broadband Wireless Access Systems, Amendment for Physical and Medium Access Control Layers for Combined and Mobile Operation in Licensed Bands, Oct. 14, 2005, pp. 165-168.

IEEE C802.16mrnr-05/005r2, "A Recommendation on PMP Mode Compatible Frame Structure", <URL: http://ieee802.org/16/sg/mmr/contrib/C80216mmr-05_005r2.pdf>, Sep. 13, 2005.

* cited by examiner

METHOD AND RELAY STATION FOR AGGREGATING SERVICE CONNECTION IDENTIFIERS IN IEEE 802.16

PRIORITY CLAIM

The present application claims priority from Japanese Patent Application No. 2006-018432 filed on Jan. 27, 2006, which are incorporated herein by reference.

BACKGROUND OF THE INVENTION

1. Field of the Invention

The present invention relates to a method and a relay station for aggregating service connection identifiers in IEEE 802.16.

2. Description of the Related Art

IEEE 802.16 is a standard of the high-speed wireless access system which can provide BWA (Broadband Wireless Access) service.

In IEEE 802.16 standardization meeting, MMR (Mobile Multi-hop Relay) technique to extend a coverage area by RS (Relay Station) is studied. In particular, a MAC (Medium Access Control) and a physical layer are established in this meeting. According to the MMR technique, BS (Base Station) not only communicates with SS (Subscriber Station) or MS (Mobile Subscriber Station) within the coverage of the BS, but the BS also communicates with SS or MS outside the coverage of BS through RS within the coverage of the BS.

Basically, the high-speed wireless access system of IEEE 802.16 is a standard of BWA service for SS which is fixed terminal (for example, refer to document 1, IEEE Std 802.16-2004). This establishes two network topologies as follows; PMP (Point-to-Multipoint) and Mesh. The PMP network is constructed in the ratio of one (BS) to majority (SS) as same as a cellular system generally). On the other hand, the Mesh network is constructed by a plurality of SSs using multi-hop technique.

According to the document 1, the relay function to extend the coverage area is not defined at all. Since an analog RS which only amplifies power of receiving signal transmits a desired Burst Profile determined by communication state between the RS-SS, the communication state between the BS-RS is not considered at all.

The coverage area could be extended by using the Mesh topology in IEEE 802.16-2004. However, Mesh is optional in the document 1, and a frame structure of Mesh does not have compatibility with PMP's one. Further, since a frame overhead size of Mesh is greater than that of PMP, this affects throughput. Furthermore, the Mesh supports only TDD (Time Division Duplex).

This system assumes the use of frequency bands more than 2 GHz is assumed. According to the frequency characteristic, the SS tends to be affected by the topography or neighboring buildings. Thus, the receiving status becomes unstable. In this case, according to the PMP network, more BS needs to be set up.

IEEE Std 802.16e-2005 (refer to document 2) is amendment of document 1 and covers MS which is mobile terminal. This standard supports only PMP as network topology. According to these standards, the base station BS gives service connection identifiers (IDs) to all subscriber station (SS or MS) that communicates with the BS.

Further, according to the IEEE 802.16 standardization meeting, a technique of translating from a plurality of CIDs between the RS-MS to one CID between the BS-RS was proposed (for example, refer to document 3).

(document 1) IEEE Std 802.16-2004, "IEEE Standard for Local and metropolitan area networks, Part 16: Air Interface for Broadband Wireless Access Systems"

(document 2) IEEE Std 802.16e/D12, "Draft IEEE Standard for Local and metropolitan area networks, Part 16: Air Interface for and Mobile Broadband Wireless Access Systems, Amendment for Physical and Medium Access Control Layers for Combined and Mobile Operation in Licensed Bands"

(document 3) IEEE C802.16mmr-05/005r2, "A Recommendation on PMP Mode Compatible Frame Structure", URL:http://ieee802.org/16/sg/mmr/contrib/C80216mmr-05_005r2.pdf.

However, the coverage of the BS in IEEE 802.16 is wide (a cell radius is 10 km at the maximum). Therefore, there is extremely much number of MSs in communication with one BS. When the BS communicates with a plurality of MSs through the RS, the number of MSs in communication with the BS becomes enormous. The BS must give service connection ID to all MSs. Thus, the number of service connection IDs managed by BS becomes enormous. That is to say, when the number of mobile subscriber stations increases, an overhead managing service connection ID increases too.

BRIEF SUMMARY OF THE INVENTION

Thus, an object of the present invention a method is provided and a relay station for aggregating service connection identifiers whereby, for the high-speed wireless access system in IEEE 802.16, an overhead of the data between BS and MS through RS can be reduced.

According to the present invention is to provide a method for aggregating service connection identifiers in IEEE 802.16, in a RS (relay station) for relaying data between a MS (mobile subscriber station) and a BS (base station), the method comprising the steps of: storing a first service connection identifier between the BS-RS corresponding to a second service connection identifier between the RS-MS in table information, for first service information requested from a first MS, receiving a service addition request including service information same as the first service information from a second MS, sending a service change request to the BS in order to change the service information, receiving a service change response from the BS, assigning a third service connection identifier between the RS-MS, storing the third service connection identifier corresponding to the first service connection identifier in the table information, sending a service addition response including the third service connection identifier to the second MS, and relaying data to translate the service connection identifier by using the first service connection identifier between the BS-RS, the second service connection identifier between the RS-first MS, and the third service connection identifier between the RS-second MS.

It is preferred that steps preceding to the steps described above comprising: receiving a service addition request including the first service information from the first MS, sending the service addition request to the BS, receiving a service addition response including the first service connection identifier from the BS, assigning the second service connection identifier between the RS-MS, storing the second service connection identifier corresponding to the first service connection identifier in the table information, and sending the service addition response including the second service connection identifier to the first MS.

It is also preferred that the MS communicates with the BS directly, receiving a service deletion request including the second or third service connection identifier from the first or second MS sending the service change request including the first service connection identifier to the BS in order to change the service information, receiving the service change response from the BS, and sending a service deletion response including the second or third service connection identifier to the second or third MS.

It is also preferred that the service connection identifier is a service flow identifier and a connection identifier.

According to the present invention to provide a method for causing a computer implemented in the RS to be executed as aggregating service connection identifiers in IEEE 802.16, the RS for relaying data between a MS and a BS, the method comprising the steps of: storing a first service connection identifier between the BS-RS corresponding to a second service connection identifier between the RS-MS in table information, for first service information required from a first MS, receiving a service addition request including service information same as the first service information from a second MS, sending a service change request to the BS in order to change the service information, receiving a service change response from the BS, assigning a third service connection identifier between the RS-MS, storing the third service connection identifier corresponding to the first service connection identifier in the table information, sending a service addition response including the third service connection identifier to the second MS, and relaying data to translate the service connection identifier by using the first service connection identifier between the BS-RS, the second service connection identifier between the RS-first MS, and the third service connection identifier between the RS-second MS.

According to the present invention to provide a RS for aggregating service connection identifiers in IEEE 802.16, comprising: means for storing table information, means for judging service information, means for assigning service connection identifiers, means for requesting service addition, means for requesting service change and means for relaying data, the table information storing means, for service information required from the MS, storing a first service connection identifier between the BS-RS corresponding to a second service connection identifier between the RS-MS, the service information judging means judging whether the service information is already registered in the table information storing means, the service connection identifier assigning means assigning a service connection identifier between the RS-MS, the service addition requesting means receiving a service addition request including the service information from the MS, then, if the service information judging means judges that the service information is already registered in the table information storing means, notifying a change of the service information to the service change requesting means, the service change requesting means sending a service change request to the BS in order to change the service information, receiving a service change response from the BS, obtaining the third service connection identifier between the RS-MS from the service connection identifier assigning means, and storing the third service connection identifier in the table information, and the data relaying means relaying data to translate the service connection identifier by using the first service connection identifier between the BS-RS, the second service connection identifier between the RS-first MS, and the third service connection identifier between the RS-second MS.

It is preferred that further comprising means for responding service addition, wherein the service addition requesting means receiving the service addition request including the service information from the MS, then, if the service information judging means judges that the service information is not registered in the table information storing means, notifying the judging to the service addition response means, and the service addition responding means sending the service addition request to the BS based on the judge from the service addition requesting means, receiving the service addition response including the first service connection identifier from the BS, assigning the second service connection identifier between the RS-MS by using the service connection identifier assigning means, storing the second service connection identifier corresponding to the first service connection identifier in the table information storing means, and notifying the service addition requesting means to send the service addition response including the second service connection identifier to the MS.

It is also preferred that further comprising means for requesting service deletion, wherein the service deletion requesting means receiving a service deletion request including the service connection identifier from the MS, notifying a change of the service information to the service change requesting means, receiving the service change response from the BS by the service change requesting means, and sending the service deletion response including the service connection identifier to the MS.

It is also preferred that the service connection identifier is a service flow identifier and a connection identifier.

According to the present invention, for the high-speed wireless access system in IEEE 802.16, when a plurality of the MSs where are located in coverage of the RS require the same QoS (Quality Of Service) information to the RS, the RS aggregates communication of those MSs, and single service connection ID is used between the BS-RS. By this, an overhead of the BS based on increment of the number of the service connection IDs can be reduced.

DETAILED DESCRIPTION OF THE INVENTION

An exemplary embodiment of the present invention relates to a method and a RS (Relay Station) for aggregating service connection IDs (identifiers) for PMP in IEEE 802.16 high-speed wireless access system. Assumed network topology locates at least one RS within the coverage of a BS (Base Station). Also, there is at least one MS (Mobile subscriber Station) within the coverage of the RS, and the MS locates outside the coverage of the BS. Thus, the MS communicates with the BS through the RS.

The service connection ID is a SFID (Service Flow IDentifier) and a CID (Connection IDentifier) specifically. Only one service connection ID is given to each MS, and the service connection ID corresponds to a QoS parameter set or a service class name required by the MS.

SFID: arbitrary identifier (32 bit) to identify QoS information (Service Flow) required by the MS CID: connection identifier (16-bit) corresponding to the SFID The SFID and CID have a relation of one-to-one. The CID is included in a header of BW-REQ (Band Width-REQuest) or a header of the MAC-PDU (Media Access Control-Protocol Data Unit). This CID specifies the SFID, and the SFID specifies the QoS information.

Also, the QoS information corresponding to the SFID is shown by "QoS parameter set" or "service class name". Different SFIDs may correspond to same QoS parameter set. Thus, QoS parameter set and SFID have a relation of one-many.

A method for aggregating service connection identifiers in the present invention has three steps as follows.

(first step) A sequence till a first MS's communication with the BS through the RS becomes possible.

(second step) A sequence till a second MS's communication with the BS through the RS becomes possible.

(third step) A sequence when the second MS moved to within the coverage of the BS.

Figure 1:
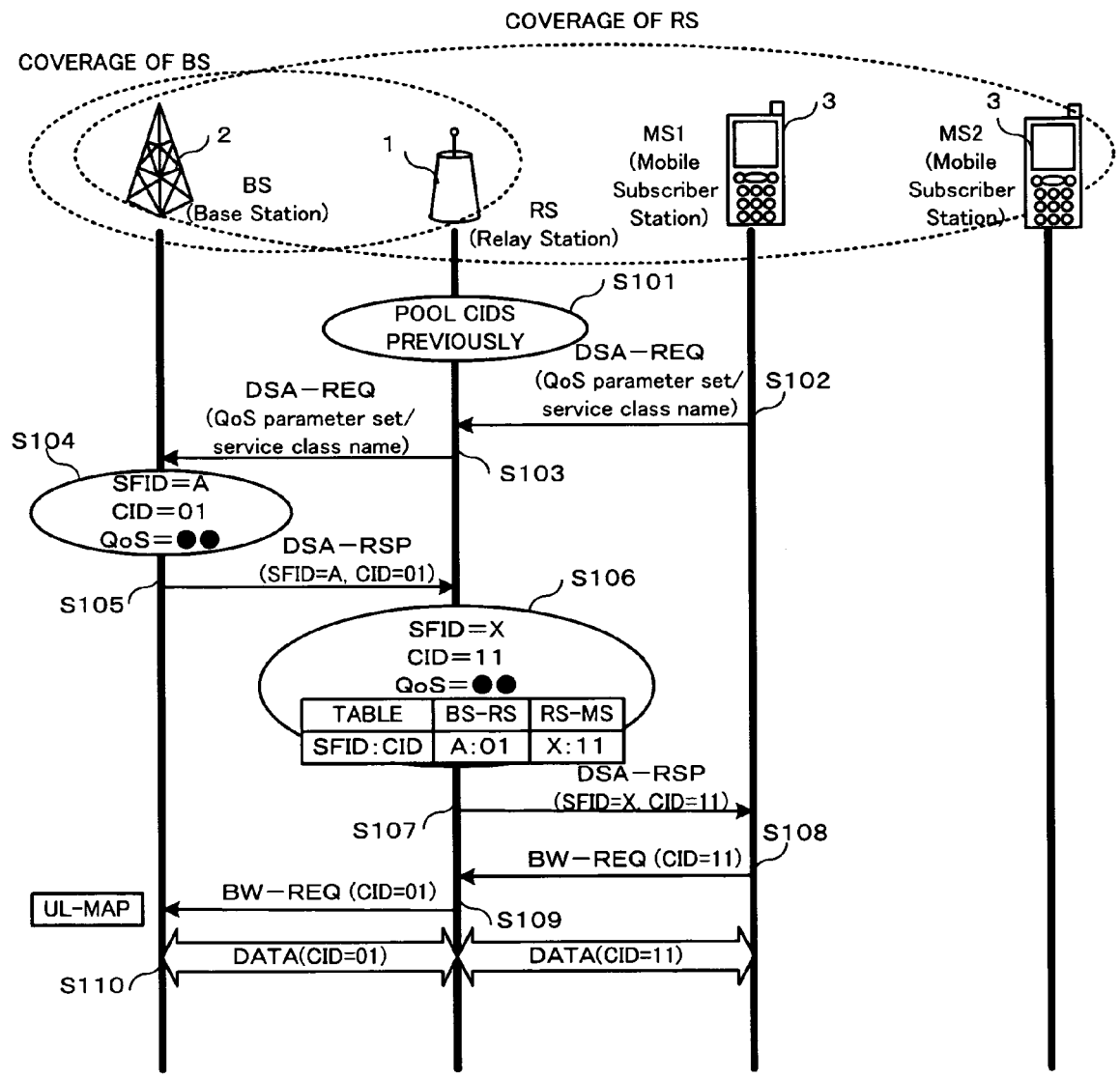
FIG. 1 shows a sequence diagram of first step in the present invention.

FIG. 1 is a sequence diagram of the first step in the present embodiment.

(S101) The RS assigns a CID to the subordinate MS. Therefore, the RS must pool a plurality of CIDs previously. These CIDs are assigned previously from the BS. Thus, a domain of CIDs to assign to the RS's subordinate MSs is different from a domain of CIDs to assign to the BS's subordinate MSs.

(S102) an MS1 (i.e., a first mobile subscriber ststion) sends a DSA-REQ (Dynamic Service Addition Request) to the RS. The DSA-REQ includes QoS information (QoS parameter set or service class name) desired by the MS1.

(S103) The RS just sends the received DSA-REQ to the BS.

(S104) The BS that received the DSA-REQ assigns a SFID and a CID used between the BS-RS. According to FIG. 1, between the BS-RS, "SFID=A" and "CID=01" are assigned for "QoS=●●".

(S105) The BS sends a DSA-RSP (Dynamic Service Addition Response) including the SFID and the CID to the RS.

(S106) The RS that received the DSA-RSP assigns a SFID and a CID used between the RS-MS1. According to FIG. 1, "SFID=X" and "CID=11" are assigned for "QoS=●●" between the RS-MS1. Further, the SFID and the CID between the BS-RS are different from the SFID and the CID between the RS-MS1.

Here, the RS registers the SFID and the CID in the table information. The table information registers the SFID and the CID between the RS-MS1 corresponding to the SFID and the CID between the BS-RS. Although sets of SFIDs and CIDs are different between both pairs, they are the same in "QoS=●●".

TABLE 1

|  | BS-RS | RS-MS |
|---|---|---|
| SFID:CID | A:01 | X:11 |
| QoS | ●● | ●● |

(S107) The RS sends a DSA-RSP including "SFID=X" and "CID=11" between the RS-MS1, to the MS1.

(S108) The MS1 sends a BW-REQ to the RS to require desired band width of the QoS information corresponding to the SFID. BW-REQ includes "CID=11" that is assigned to by the RS.

(S109) Further, the RS that received the BW-REQ requires a band width required from MS1, to the BS. The RS sends BW-REQ including the CID to the BS. Here, the BW-REQ is translated from "CID=11" between the RS-MS into "CID=01" between the BS-RS based on the table information. The BS that received the BW-REQ makes an UL-MAP (MAP message of UPlink) related between the BS-RS and the between the RS-MS1. The RS and the MS1 send data to the BS based on UL-MAP.

(S110) A header of MAC-PDU transmitted between the RS-MS1 includes "CID=11". On the other hand, a header of MAC-PDU transmitted between the BS-RS includes "CID=01".

Figure 2:
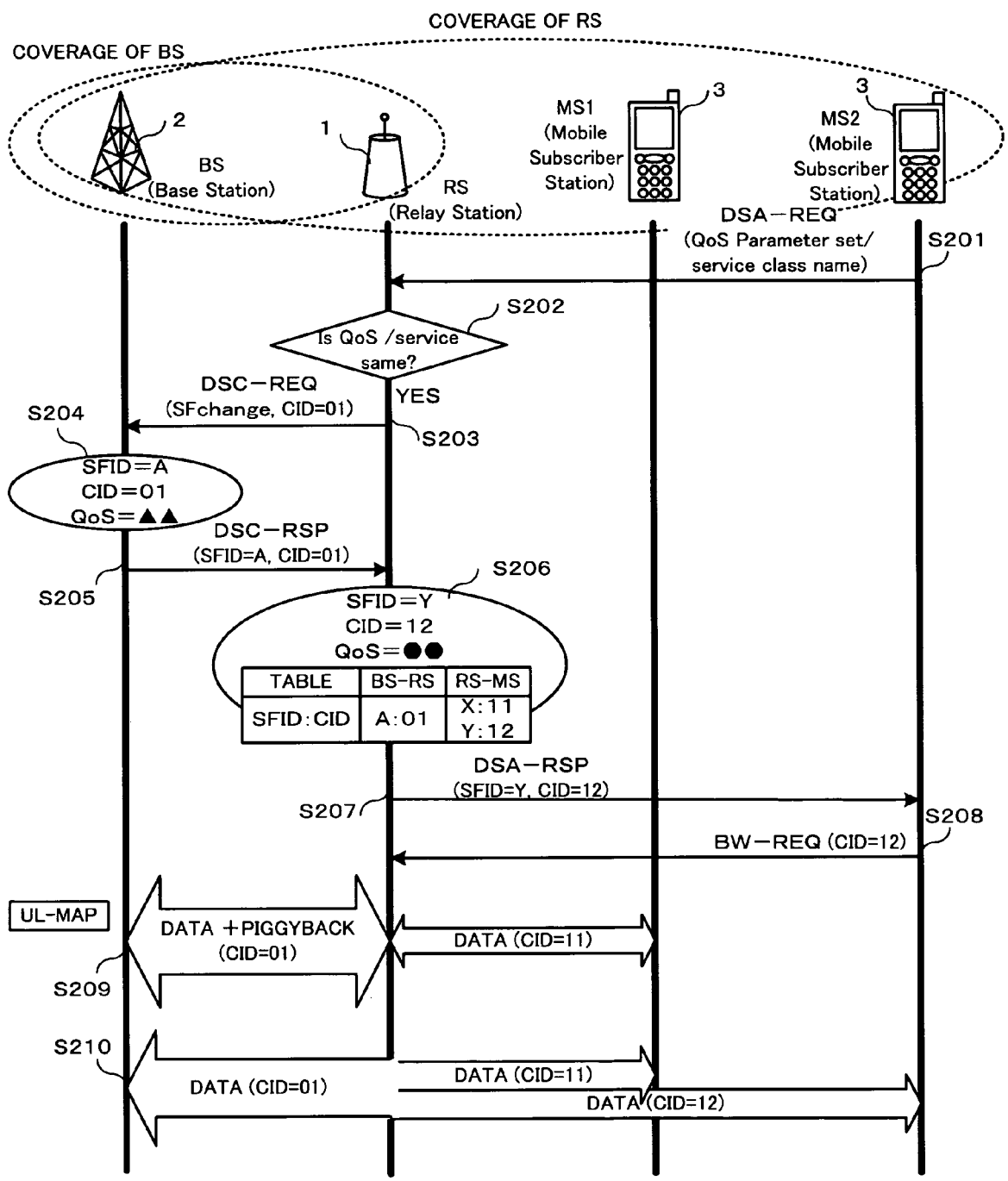
FIG. 2 shows a sequence diagram of second step in the present invention.

FIG. 2 is a sequence diagram of the second step in the present embodiment.

(S201) During data communication of the first step, an MS2 (i.e., a second mobile subscriber station) sends a DSA-REQ to the RS. The DSA-REQ includes QoS information (QoS parameter set or service class name) desired by the MS2. According to FIG. 2, the QoS information required by the MS2 is the same as QoS information required by the MS1.

(S202) The RS that received the DSA-REQ refers to the table information. And the RS determines whether the QoS information included in the DSA-REQ accords with existing QoS information under the RS. According to FIG. 2, "QoS=●●" is already registered in the table information.

(S203) The RS sends a DSC-REQ (Dynamic Service Change Request) to the BS. The DSC-REQ requires a service change to the BS by using CID between the BS-RS, corresponding to "QoS=●●" already assigned. Here, the RS requires the QoS information of the double of the band width corresponding to "CID=01", to the BS. The RS aggregates the band width of a plurality of MSs desiring the same QoS information, and requires the change of the band width to the BS. The RS should be got double band width of the MS1 to the BS.

(S204) The BS that received the DSC-REQ just holds the SFID and the CID used between the BS-RS. But the BS changes to "QoS=▲▲". This is modification only for service description, and the band width is changed to double.

(S205) The BS sends a DSC-RSP (Dynamic Service Change Response) to the RS. The DSC-RSP includes "SFID=A" and "CID=01", which are not changed.

(S206) The RS that received the DSC-RSP assigns a SFID and a CID used between the RS-MS2. According to FIG. 2, "SFID=Y" and "CID=12" are assigned for "QoS=●●" between the RS-MS2.

Here, the RS registers the SFID and the CID in the table information. The table information registers the SFID and the CID between the RS-MS2 corresponding to the SFID and the CID between the BS-RS.

TABLE 2

|  | BS-RS | RS-MS |
|---|---|---|
| SFID:CID | A:01 | X:11<br>Y:12 |
| QoS | ▲▲ | ●● |

(S207) The RS sends a DSA-RSP including "SFID=Y" and "CID=12" assigned to between the RS-MS2, to the MS2.

(S208) The MS2 requires the desired band width of the QoS information corresponding to the SFID. Therefore, the MS2 sends BW-REQ to the RS. The BW-REQ includes "CID=12" assigned to by the RS.

(S209) Further, the RS that received the BW-REQ requires band width required from MS2, to the BS. Here, The RS may send a BW-REQ to the BS. Also, uplink data from the MS1 to the BS may use a piggyback. The piggyback may include information in the BW-REQ requiring a desired band width of MS2. Then, the CID included in the BW-REQ is translated from "CID=12" between the RS-MS2 into "CID=01" between the BS-RS based on the table information. The BS that received the piggyback makes a UL-MAP related between the BS-RS, between the RS-MS1 and between the RS-MS2.

(S210) The header of the MAC-PDU transmitted between the RS-MS2 includes "CID=11". The header of the MAC-PDU transmitted between the BS-RS includes "CID=01".

According to FIG. 2, between the BS-RS, it is only necessary to manage just one CID for the same QOS regardless of the number of MSs under the RS. That is to say, even if the number of MSs under the RS is increased, an overhead for managing CIDs in the BS is not increased.

Figure 3:
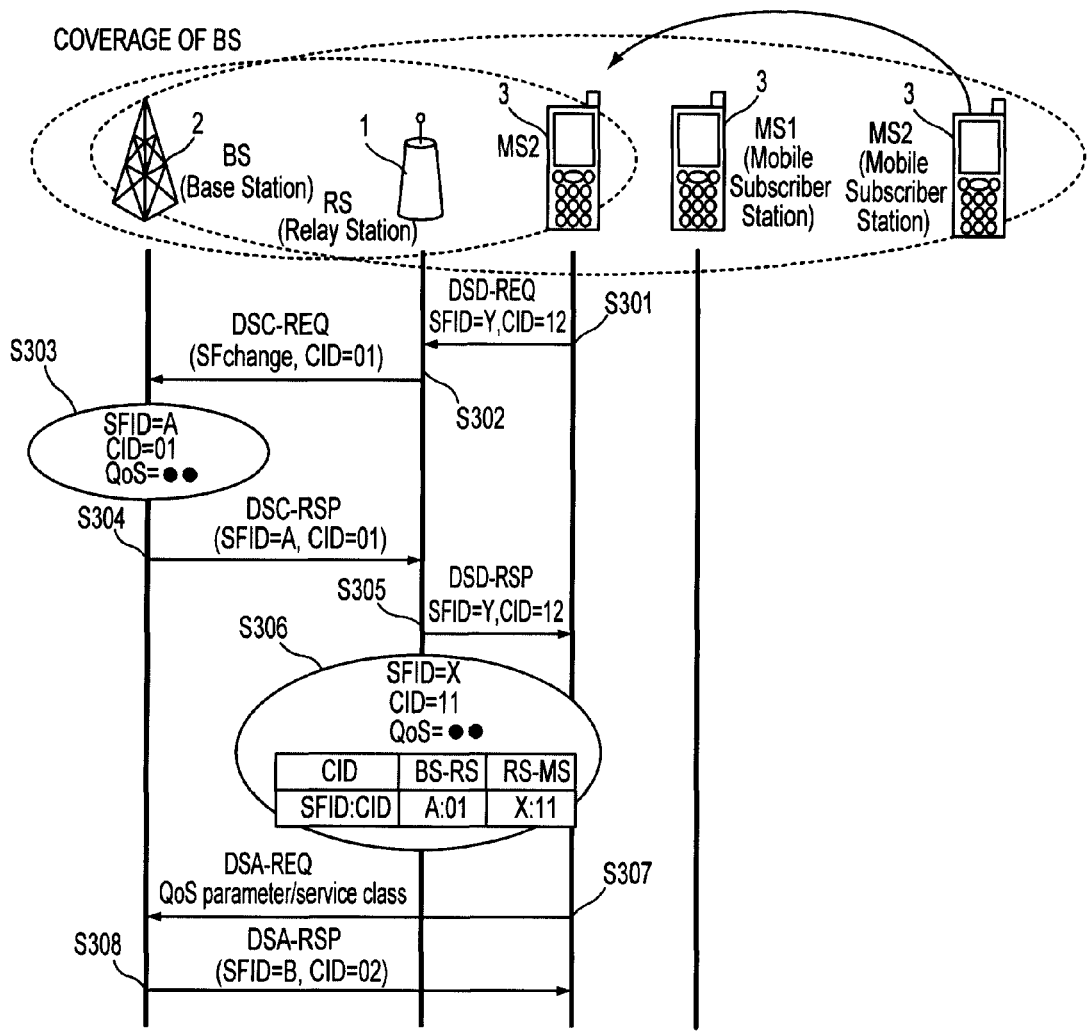
FIG. 3 shows a sequence diagram of third step in the present invention.

FIG. 3 is a sequence diagram of the third step in the present embodiment.

(S301) During data communication of the second step, the MS2 moved to within the coverage of the BS. Then, the MS2 communicates with the BS directly without going through RS. Thus, MS2 sends a DSD-REQ (Dynamic Service Deletion Request) to the RS. The DSD-REQ includes "SFID=Y" and "CID=12" assigned to the MS2.

(S302) The RS that received the DSD-REQ sends a DSC-REQ including the CID to the BS. Here, the RS refers to the table information, and "SFID=Y" and "CID=12" between the RS-MS2 are translated into "SFID=A" and "CID=01" between the BS-RS. The service description is changed the band width to ½. The RS should reduce the band width of MS2 with the same QoS information.

(S303) The BS that received the DSC-REQ changes to "QoS=●●" for SFID and CID used between the BS-RS. The band width in the service description is changed to ½.

(S304) The BS sends a DSC-RSP to the RS. The DSC-RSP includes "SFID=A" and "CID=01" and they are not changed.

(S305) The RS sends a DSD-RSP including "SFID=Y" and "CID=12" assigned to between the RS-MS2, to the MS2.

(S306) The RS deletes SFID and CID used between the RS-MS2 from the table information. The table information is as follows.

TABLE 3

|  | BS-RS | RS-MS |
|---|---|---|
| SFID:CID | A:01 | X:11 |
| QoS | ●● | ●● |

(S307) Then, the MS2 sends a DSA-REQ to the BS. The DSA-REQ includes QoS information (QoS parameter set or service class name) desired by the MS2. (S308) The BS that received the DSA-REQ assigns SFID and CID used between the BS-MS2. The BS sends DSA-RSP including SFID and CID to the MS2.

According to FIG. 3, the MS2 moves to within the coverage of BS from a position where the MS2 communicated with the BS through RS. In this case, the BS changes only the service description. The CID is not changed. The BS reduces an overhead for managing the CIDs.

Figure 4:
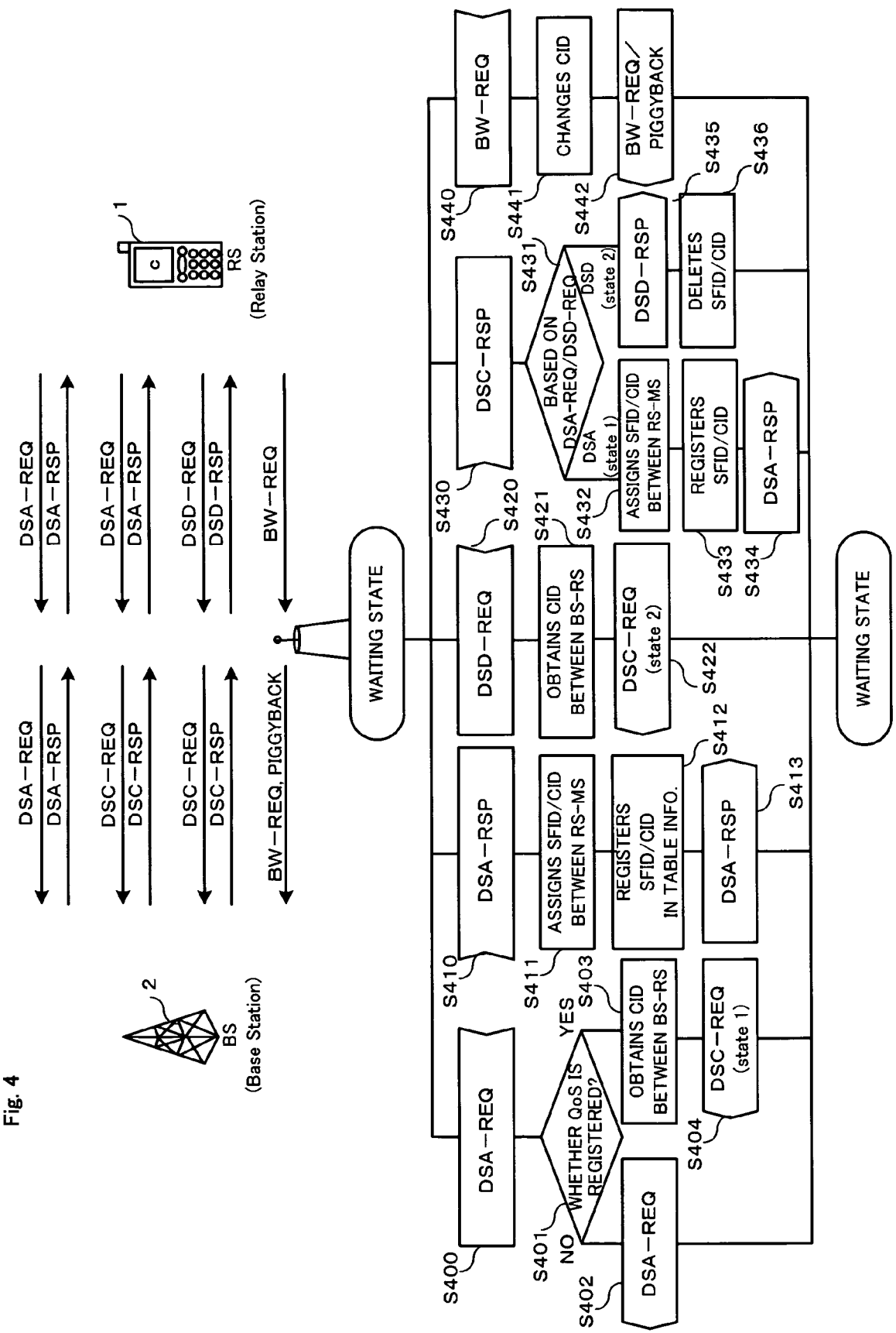
FIG. 4 shows a state transition flowchart of the RS in the present invention.

FIG. 4 is a state transition flowchart of the RS in the present embodiment.

According to FIG. 4, a process flow when the RS received the following messages is shown.

DSA-REQ (Dynamic Service Addition-REQuest) received from MS

DSA-RSP (Dynamic Service Addition-ReSPonse) received from BS

DSD-REQ (Dynamic Service Deletion-REQuest) received from MS

DSC-RSP (Dynamic Service Change-ReSPonse) received from BS

BW-REQ (Band Width-REQuest) received from MS (S400) The DSA-REQ is received from MS.

(S401) The table information is referred to. It is judged whether QoS information included in the DSA-REQ is already registered.

(S402) If the same QoS information is not registered in the table information, the DSA-REQ is sent to the BS.

(S403) If the same QoS information is registered in the table information, a CID between the BS-RS of the QoS information is obtained.

(S404) The DSC-REQ including the CID is sent to the BS.

(S410) The DSA-RSP is received from the BS.

(S411) The SFID and CID between the RS-MS are assigned.

(S412) The SFID and CID between the RS-MS corresponding to the SFID and the CID between the BS-RS included in DSA-RSP are registered in the table information.

(S413) The DSA-RSP including the SFID and the CID between the RS-MS is sent to the MS.

(S420) It is assumed that the DSD-REQ was received from the MS.

(S421) The table information is referred to. And the CID between the BS-RS corresponding to the CID included in DSD-REQ is obtained.

(S422) The DSC-REQ including the CID between the BS-RS is sent to the BS.

(S430) The DSC-RSP is received from the BS.

(S431) It is judged that the received DSC-RSP is based on the DSA-REQ (S404) or based on the DSD-REQ (S422).

(S432) In case based on the DSA-REQ, a SFID and a CID between the RS-MS are assigned.

(S433) The SFID and the CID between the RS-MS corresponding to the SFID and the CID between the BS-RS included in DSA-RSP are further registered in the table information.

(S434) The DSA-RSP including the SFID and the CID between the RS-MS is sent to the MS.

(S435) In case based on the DSD-REQ, they are translated into the SFID and the CID between the RS-MS. And the DSD-RSP is sent to the MS.

(S436) The SFID and CID between the RS-MS are deleted from the table information.

(S440) The BW-REQ is received from the MS.

(S441) The table information is referred to, and the CID in the BW-REQ is changed to the CID between the BS-RS.

(S442) The BW-REQ is sent to the BS. Here, it may be included in data as a piggyback, and the BW-REQ may be sent to the BS.

Figure 5:
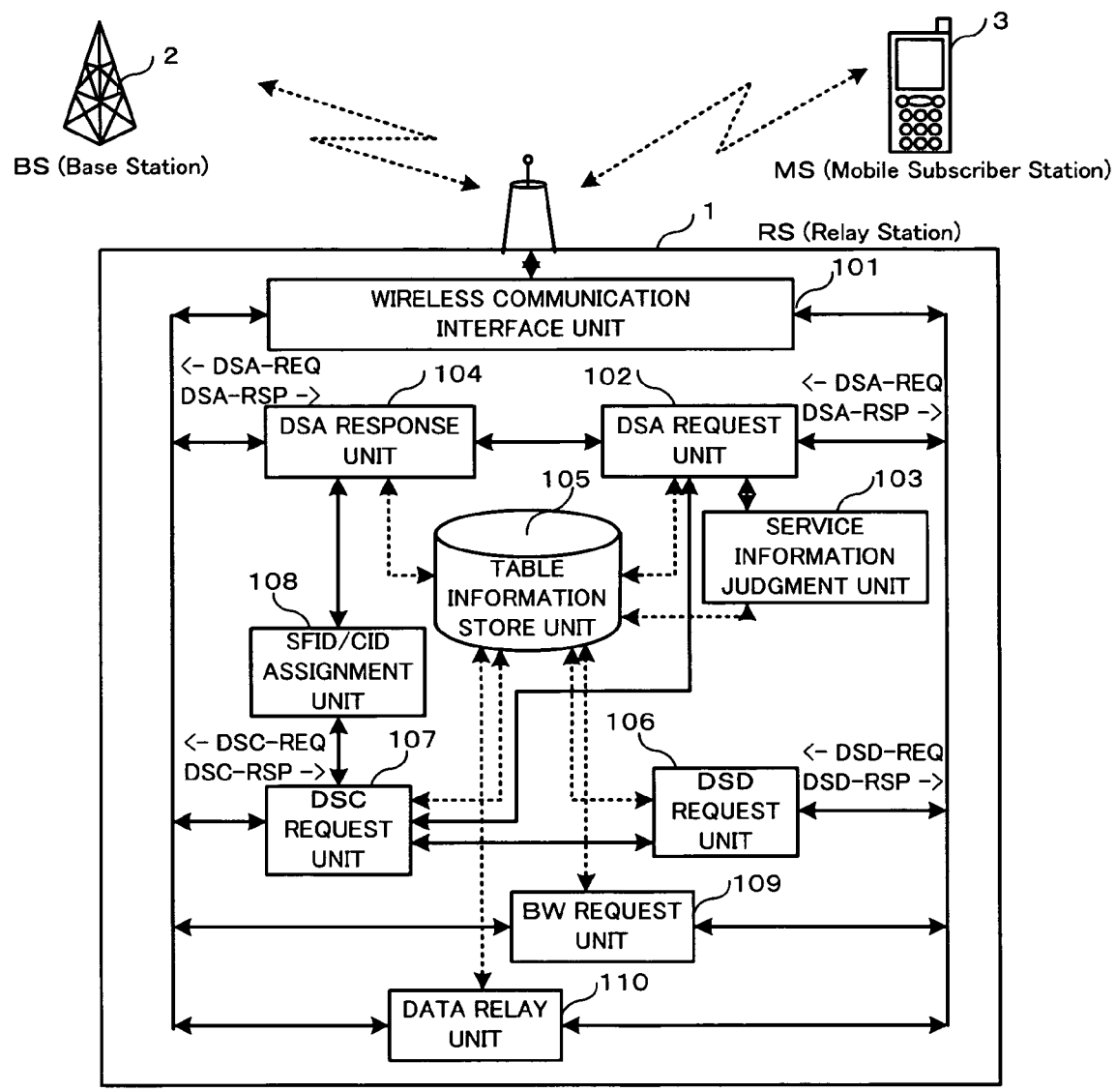
FIG. 5 shows a functional configuration diagram of the RS in the present invention.

FIG. 5 is a functional configuration diagram of the RS in the present embodiment.

According to FIG. 5, the RS has a wireless communication interface unit 101, a DSA request unit 102, a service information judgment unit 103, a DSA response unit 104, a table information store unit 105, a DSD request unit 106, a DSC request unit 107, a SFID/CID assignment unit 108, a BW request unit 109 and a data relay unit 110. A program to be executed with a computer implemented in the RS can also realize these function units.

The table information store unit 105, for service information (QoS information) required from the MS, stores the service connection identifier between the BS-RS corresponding to the service connection identifier between the RS-MS.

The service information judgment unit 103 judges whether the same service information is already registered in the table information store unit 105.

The SFID/CID assignment unit 108 assigns a service connection identifier (SFID/CID) between the RS-MS.

The DSA request unit 102 receives the DSA-REQ including the QoS information from the MS. Then, if the service information judgment unit 103 judges that the QoS information is already registered in the table information, the DSA request unit 102 notifies a change of the service information to the DSC request unit 107. On the other hand, if the QoS information is not registered in the table information, the DSA request unit 102 notifies an addition of the service information to the DSA response unit 104. Also, the DSC request unit 107 and the DSA response unit 104 notifies the response to the DSA request unit 102, and the DSA request unit 102 sends the DSA-RSP to the MS.

The DSD request unit 106 receives the service deletion request from the MS, and notifies the change of the service information to the DSC request unit 107. Also, the DSC request unit 107 notifies the response to the DSD request unit 106, and the DSD request unit 106 sends the DSD-RSP to the MS.

The DSC request unit 107 sends the DSC-REQ to the BS in order to change the service information based on the indication from the DSA request unit 104 or the DSD request unit 106. The DSC request unit 107 receives DSC-RSP from the BS, and obtains a SFID and a CID between the RS-MS from the SFID/CID assignment unit 108. The DSC request unit 107 stores the SFID and the CID in the table information. And the DSC request unit 107 notifies the response to the DSA request unit 102 and the DSD request unit 106.

The DSA response unit 104 sends the DSA-REQ to the BS based on the indication from the DSA request unit 102. Also, the DSA response unit 104 receives the DSA-RSP including the first service connection identifier from the BS, and obtains the second service identifier between the RS-MS from the SFID/CID assignment unit 108. Further, the DSA response unit 104 registers the first service connection identifier corresponding to the second service connection identifier in the table information store unit 105. And the DSA response unit 104 notifies a response from the BS, to the DSA request unit 102.

The data relay unit 110 relays data to translate the service connection identifier by using the first service connection identifier between the BS-RS, the second service connection identifier between the RS-1st MS, and the third service connection identifier between the RS-2nd MS.

According to the previously described embodiment, the RS relates CID between BS-RS to CID between the RS-MS, and the RS converts them. On the other hand, the present invention can be applied to the tunneling technique of the layer 2 which is a well-known technique. This technique encapsulates one MAC header by other MAC header. Thereby, the data with one MAC header can pass into the virtual communication path of tunneling by the other MAC header. That is to say, the present invention can be combined with the tunneling technique. The RS encapsulates the data with the MAC header including CID between RS-MS by the MAC header including the CID between BS-RS. Thus, the data between RS-MS pass into the communication path of tunneling between BS-RS. The assignment method of CID by tunneling is in the technical idea of the present invention.

According to the present embodiment, for the high-speed wireless access system in IEEE 802.16, when a plurality of MSs where are located in coverage of RS require the same QoS information to the RS, the RS aggregates communications of those MSs, and a single service connection ID is used between the BS-RS. By this, an overhead of the BS based on increment of the number of the service connection IDs can be reduced.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A method for a relay station to relay data between mobile subscriber stations and a base station, the mobile subscriber stations including first and second mobile subscriber stations, the method comprising:

storing information in a table, said information including correspondence information between a first service connection identifier assigned between the base station and the relay station and a second service connection identifier assigned between the relay station and the first mobile subscriber station, in association with first service information requested from the first mobile subscriber station, wherein the first service information is registered;

receiving a service addition request including second service information from the second mobile subscriber station;

determining whether the second service information is the same as the first service information which has been registered previously;

if a determination is made that the second service information is not the same as the first service information, sending the service addition request to the base station, and if a determination is made that the second service information is the same as the first service information, sending, a service change request to the base station;

after sending the service change request to the base station, receiving a service change response from the base station;

assigning a third service connection identifier between the relay station and the second mobile subscriber station;

if a determination is made that the second service information is the same as the first service information, storing in the table the third service connection identifier in association with the first service connection identifier;

if a determination is made that the second service information is the same as the first service information, sending a service addition response including the third service connection identifier, to the second mobile subscriber station, without prior reception of any service addition response from the base station; and by the use of the table, translating between service connection identifiers assigned between the base station and the relay station and service connection identifiers assigned between the relay station and the mobile subscriber stations, such that, if a determination is made that the second service information is the same as the first service information, the first service connection identifier is assigned between the base station and the relay station, wherein the first service connection identifier is used in common to the first and second subscriber stations that request respective services the same in service information as each other, to thereby allow for service connection identifier aggregation between the base station and the relay station, such that the second service connection identifier is assigned between the relay station and the first mobile subscriber station, and such that the third service connection identifier is assigned between the relay station and the second mobile subscriber station, and relaying data between the base station and the mobile subscriber stations.

2. The method according to claim 1, further comprising:

receiving a service addition request including the first service information, from the first mobile subscriber station;

sending the service addition request to the base station;

receiving a service addition response including the first service connection identifier, from the base station;

assigning the second service connection identifier between the relay station and the first mobile subscriber station;

storing in the table information storage a correspondence between the second service connection identifier and the first service connection identifier; and sending the service addition response including the second service connection identifier, to the first mobile subscriber station.

3. The method according to claim 1, further comprising:

receiving a service deletion request including the second or third service connection identifier, from the first or second mobile subscriber station;

sending a service change request including the first service connection identifier, to the base station;

receiving a service change response from the base station; and sending the service deletion response including the second or third service connection identifier, to the first or second mobile subscriber station.

4. The method according to claim 1, wherein the service connection identifier includes a service flow identifier and a connection identifier.

5. An apparatus for a relay station to relay data between mobile subscriber stations and a base station, the mobile subscriber stations including first and second mobile subscriber stations, the apparatus comprising:

a first recorder for storing information in a table said information including correspondence information between a first service connection identifier assigned between the base station and the relay station and a second service connection identifier assigned between the relay station and the first mobile subscriber station, in association with first service information requested from the first mobile subscriber station, wherein the first service information is registered;

a first receiver for receiving a service addition request including second service information from the second mobile subscriber station;

a section configured to determine whether the second service information is the same as the first service information which has been registered previously;

a first transmitter for, if a determination is made that the second service information is not the same as with the first service information, sending the service addition request to the base station, and if a determination is made that the second service information is the same as the first service information, sending a service change request to the base station;

a second receiver for receiving a service change response from the base station, after sending the service change request to the base station;

a section for assigning a third service connection identifier between the relay station and the second mobile subscriber station;

a second recorder for storing information in the table, the third service connection identifier in association with the first service connection identifier, if a determination is made that the second service information is the same as the first service information;

a second transmitter for sending a service addition response including the third service connection identifier to the second mobile subscriber station, without prior reception of any service addition response from the base station, if a determination is made that the second service information is the same as the first service information; and a translator for, by the use of the information in the table translating between service connection identifiers assigned between the base station and the relay station and service connection identifiers assigned between the relay station and the mobile subscriber stations, such that, if a determination is made that the second service information is the same as the first service information, the first service connection identifier is assigned between the base station and the relay station, wherein the first service connection identifier is used in common to the first and second subscriber stations that request respective services the same as in service information with each other, to thereby allow for service connection identifier aggregation between the base station and the relay station, such that the second service connection identifier is assigned between the relay station and the first mobile subscriber station, and such that the third service connection identifier is assigned between the relay station and the second mobile subscriber station, and relaying data between the base station and the mobile subscriber stations.

6. The method according to claim 1, wherein each set of the service information includes information on a quality of service (QoS).

7. The method according to claim 1, wherein each set of the service information includes information on a bandwidth.

8. The method according to claim 7, wherein the service change request is sent to the base station to increase the bandwidth.

9. The method according to claim 1, wherein each set of the service information includes information on a service class name.

10. The method according to claim 1, wherein the relay station relays the data in IEEE 802.16.

* * * * *